(12) United States Patent
Ehmann

(10) Patent No.: US 8,173,187 B2
(45) Date of Patent: May 8, 2012

(54) ASSEMBLY FOR PRESENTING AND PREPARING A PUFFED COMPOSITION

(75) Inventor: Michael Ehmann, Bézéril (FR)

(73) Assignee: Natais, Bezeril (FR)

( * ) Notice: Subject to any disclaimer, the term of this patent is extended or adjusted under 35 U.S.C. 154(b) by 861 days.

(21) Appl. No.: 12/088,380

(22) PCT Filed: Sep. 27, 2006

(86) PCT No.: PCT/FR2006/002192
§ 371 (c)(1),
(2), (4) Date: Sep. 29, 2008

(87) PCT Pub. No.: WO2007/036635
PCT Pub. Date: Apr. 5, 2007

(65) Prior Publication Data
US 2009/0169688 A1    Jul. 2, 2009

(30) Foreign Application Priority Data
Sep. 29, 2005 (FR) ...................... 05 09941

(51) Int. Cl.
*A21D 10/02* (2006.01)

(52) U.S. Cl. ........ 426/107; 426/234; 426/395; 219/727; 219/730

(58) Field of Classification Search .................. 426/107, 426/234, 395; 219/727, 730
See application file for complete search history.

(56) References Cited

U.S. PATENT DOCUMENTS
5,214,257 A    5/1993    Riskey

FOREIGN PATENT DOCUMENTS

| EP | 0 545 611 | 6/1993 |
|---|---|---|
| EP | 1154706 B1 | 9/2002 |
| WO | WO 00/064156 | 10/2000 |
| WO | WO 2004/032633 | 4/2004 |
| WO | WO 2004/087530 | 10/2004 |

*Primary Examiner* — Rena Dye
*Assistant Examiner* — Chaim Smith
(74) *Attorney, Agent, or Firm* — Blank Rome LLP

(57) ABSTRACT

The invention concerns an assembly for preparing and presenting an edible composition designed to be puffed including a first portion defining a chamber for enabling the puffed composition to be presented, and a second portion defining a storage chamber designed to include at least one non-puffed composition, the second portion being arranged in the first portion. The invention also concerns a method for preparing a composition to be puffed using the assembly.

14 Claims, 4 Drawing Sheets

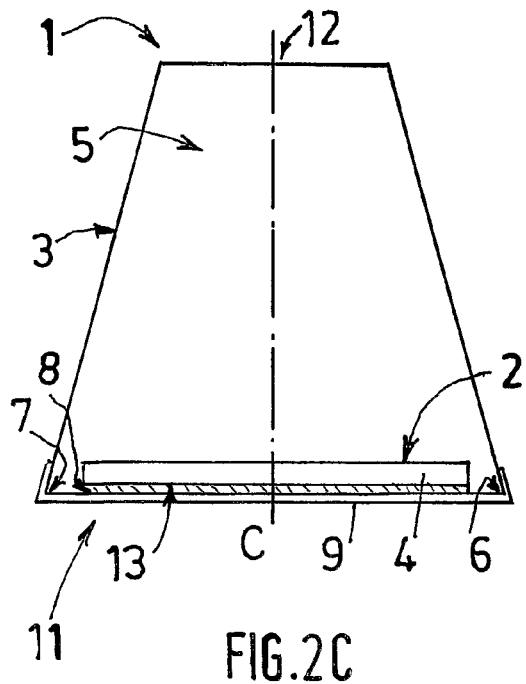
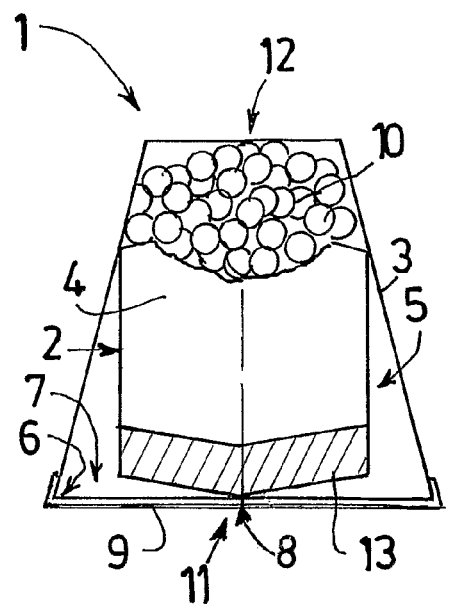
FIG.2C   FIG.3A
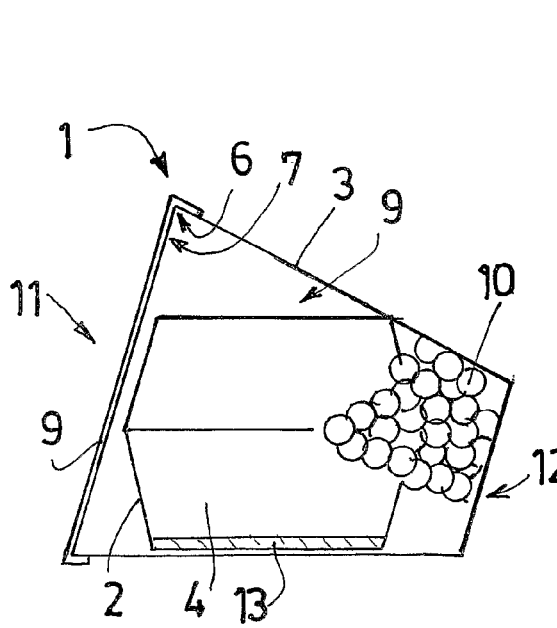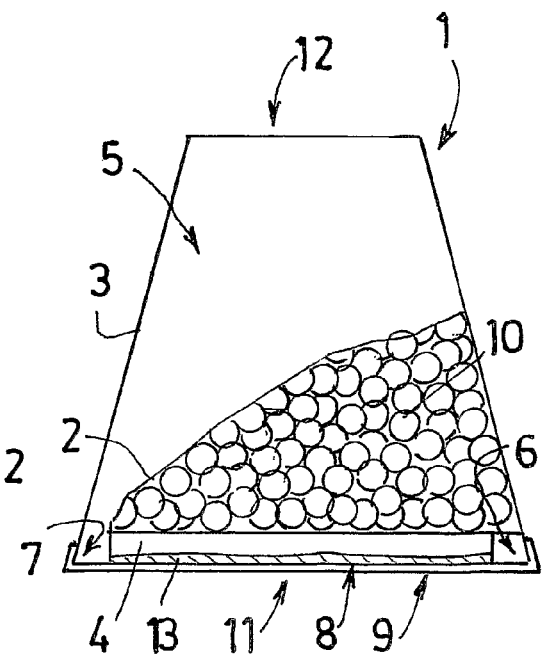
FIG.3B   FIG.3C

ASSEMBLY FOR PRESENTING AND PREPARING A PUFFED COMPOSITION

CROSS-REFERENCE TO RELATED APPLICATIONS

The present application is a National Phase of PCT/FR06/002192, filed Sep. 27, 2006, which claims the benefit of French Patent Application No. 05/09941, filed Sep. 29, 2005, the entire disclosures of which are incorporated by reference herein.

FIELD OF THE INVENTION

The present invention concerns an assembly for presenting and preparing a puffed composition and a method for preparing and presenting a puffed composition.

The present invention concerns numerous types of puffed compositions, in particular popcorn.

BACKGROUND OF THE INVENTION

As used in the present invention, "puffed composition" means a composition at least some components of which are expandable. For example the volume of said expandable particles once puffed is greater or equal to two times, notably five times, in particular ten times, more particularly twenty times, or even fifty times the volume before puffing.

Said particles may be puffed notably when exposed to heat.

Assemblies are known comprising a packaging and corn grains to be burst, again known as non-puffed, designed to be puffed, notably in a microwave oven, in order to obtain popcorn. Said compositions generally comprise edible fat, notably of the oil or fat type, in fairly large quantities. This often results in, on the one hand, development of a fairly unpleasant deep-fat frying odour. On the other hand, the packaging is frequently soiled by the fat of the composition, which may cause an unpleasant contact with the fingers of the consumer.

Thus there remains a need for an assembly for preparing, notably via microwaves, and for presenting a puffed composition which does not have the abovementioned disadvantages.

Inventors have thus discovered that a specific assembly enabled the abovementioned disadvantages to be resolved at least partially.

SUMMARY OF THE INVENTION

According to a first aspect, the aim of the invention is an assembly for preparing and presenting an edible composition designed to be puffed comprising:
- a portion (A) defining a chamber for enabling the puffed composition to be presented,
- a portion (B) defining a storage chamber designed to include at least one non-puffed composition, said portion (B) being arranged in the portion (A).

The assembly according to the invention enables notably the quantity of fat that is present in and/or in contact with the presentation portion (A) to be limited. Indeed, the portion (B), possibly combined with another portion, may also enable at least one portion of the fat to be collected.

BRIEF DESCRIPTION OF THE FIGURES

FIGS. 2A, 2B and 2C: Cross-sectional views of the preparation and presentation assemblies before preparation.

FIGS. 3A, 3B and 3C: Cross-sectional views of the preparation and presentation assemblies during the puffing of the composition.

DETAILED DESCRIPTION OF THE PREFERRED EMBODIMENTS

Figure 1A:
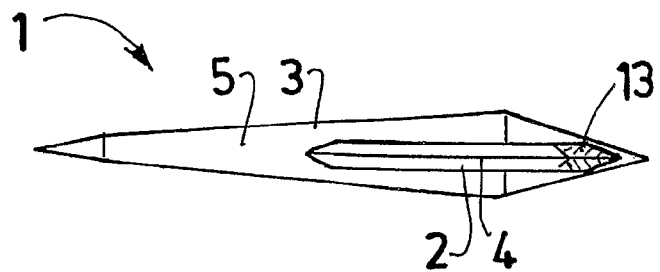
FIGS. 1A and 1B: Cross-sectional views of the preparation and presentation assemblies in folded mode.

The figures are presented merely as an illustration in a strictly non-limiting manner of the invention.

The assembly according to the invention may also comprise at least one non-puffed composition, notably in the portion (B), and in particular only in the portion (B).

The assembly (1) comprises a wall (2) defining a portion (B) designed to form a storage chamber (4) for the composition designed to be puffed. Said device (1) also comprises a wall (3) defining at least one portion (A) designed to form a chamber for presenting (5) the puffed composition.

The portions (A) and (B) are generally clearly distinct. In particular they are separate, i.e. share no element, or only share at most one means of attachment.

In particular, the portion (B) is structured to be arranged in the portion (A) such as to confine the puffed composition during the puffing.

As used in the present invention, "confine" means that the portion (B) isolates at least one portion of the interior of the assembly of the puffed composition. In particular, the portion (B) enables the composition, puffed and/or non-puffed, not to come into contact with at least one portion of the interior of the assembly, notably the upper face thereof or a wall.

The assembly (1) according to the invention may comprise a susceptor (13) arranged such that when the assembly (1) is subjected to microwave heating, it enables the composition designed to be puffed to reach the temperature enabling the puffing of said composition, in particular when:
- the axis of the assembly has an angle greater than or equal to 10°, notably greater than or equal to 15° and in particular greater than or equal to 20°, in relation to a vertical axis, or
- the axis of the assembly has an angle less than or equal to 20°, notably less than or equal to 15°, and in particular less than or equal to 10° in relation to a vertical axis and the upper face is located below the lower face.

In particular, the assembly is placed on the plate of the oven via one of the lateral walls thereof or via the upper face thereof.

According to one specific embodiment, the axis of the assembly according to the invention may have an angle less than or equal to 45°, notably less than or equal to 30°, and in particular an angle less than or equal to 15° with a horizontal axis, or even be horizontal.

According to another specific embodiment, the axis of the assembly according to the invention may have an angle less than or equal to 5° in relation to the vertical, or even be vertical and enable, when the assembly (1) is subjected to microwave heating with the upper face placed below the lower face, the composition to be puffed. In other words, the device may be arranged such that when the axis of the assembly is substantially vertical and that said device rests on the upper face thereof in an oven, notably a microwave oven, the heating enables the composition to be puffed, while soiling little or not soiling the presentation portion (5).

In particular, in the case of microwave heating, the specific arrangement of the susceptor in the vicinity of the upper face, or even only on the upper face or on the removable portion, and most particularly on the lid may enable the composition to be puffed.

Figure 2A:
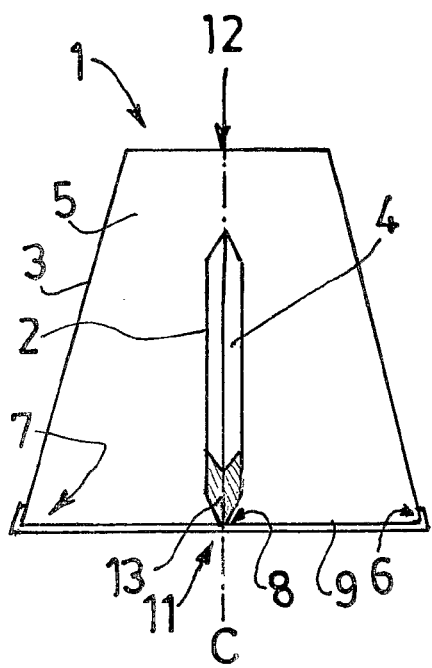
Figure 2B:
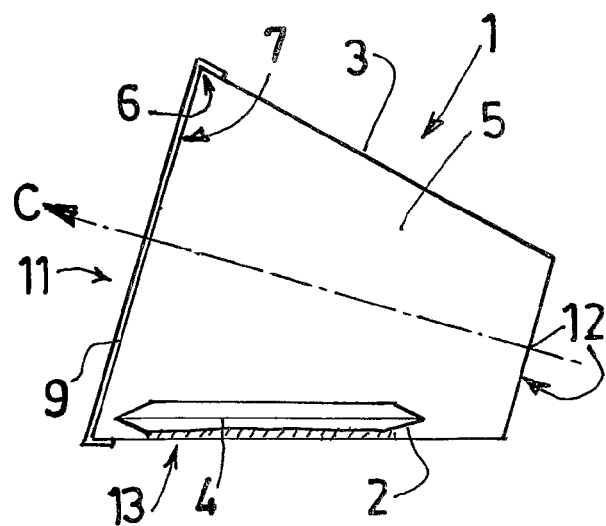
Figure 4A:
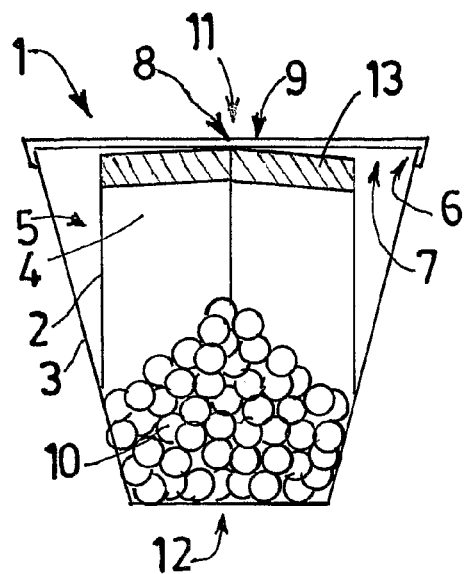
FIGS. 4A, 4B and 4C: Cross-sectional views of the assemblies before opening.
Figure 4B:
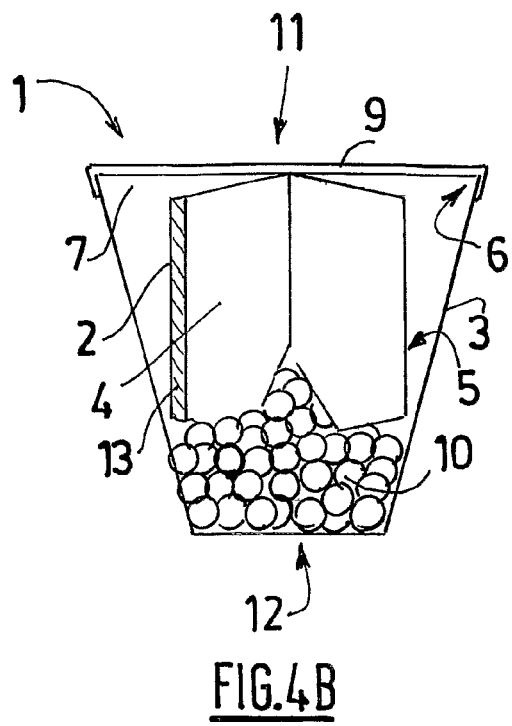
Figure 4C:
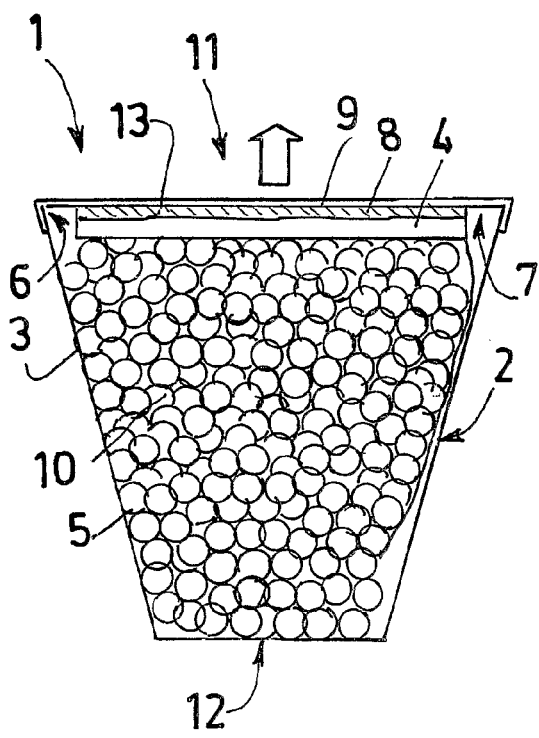
Figure 5A:
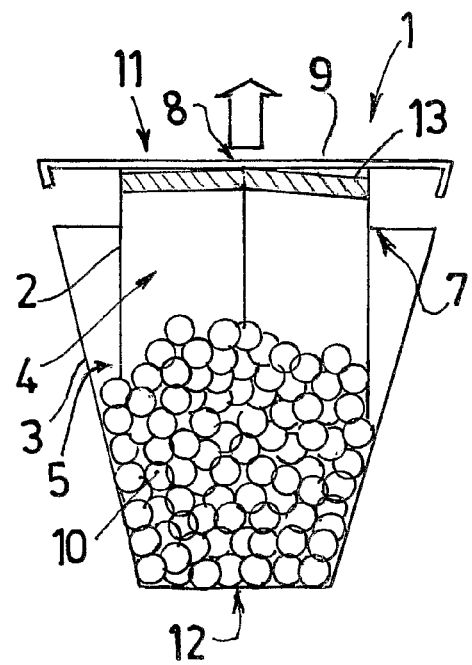
FIGS. 5A, 5B and 5C: Cross-sectional views of the assemblies during the separation or extraction of the storage chamber.
Figure 5B:
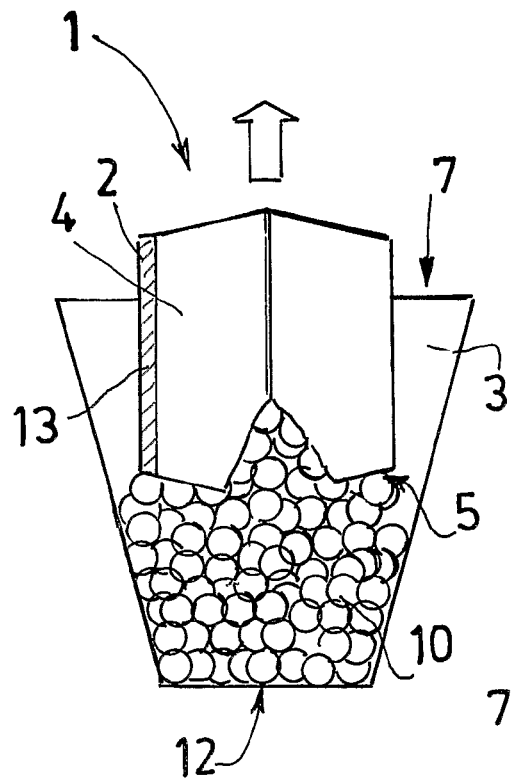
Figure 5C:
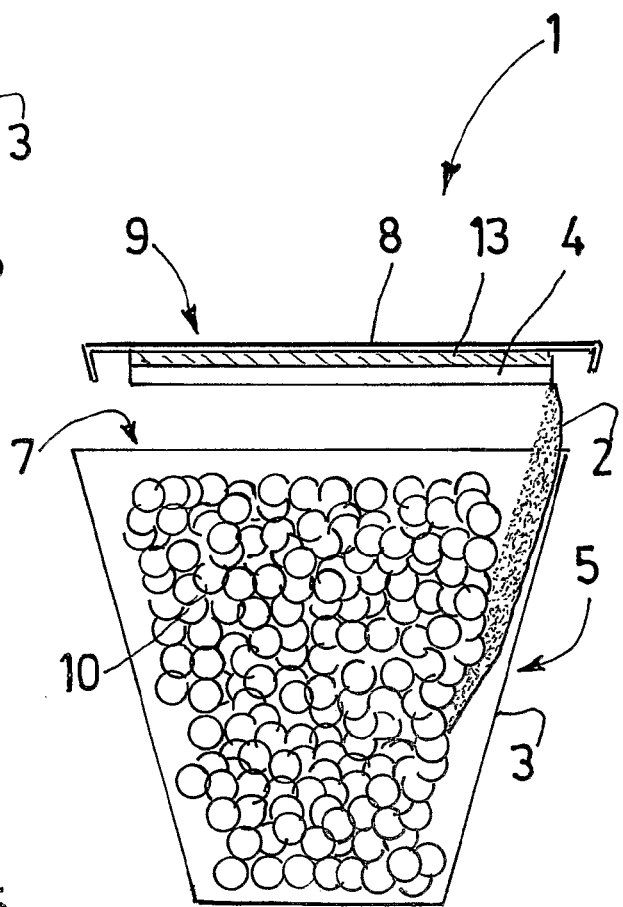
Figure 6:
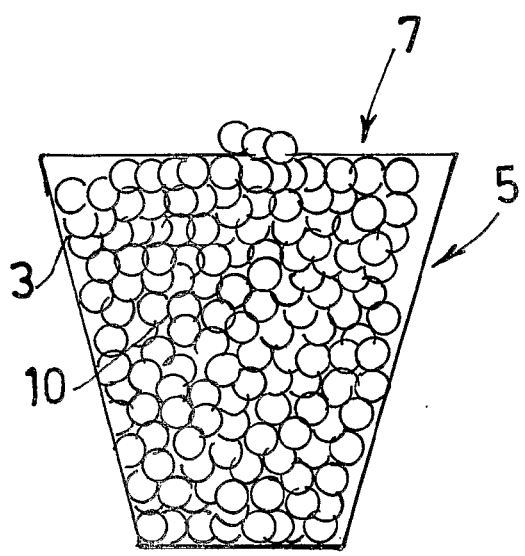
FIG. 6: Cross-sectional view of a puffed composition presentation portion of an assembly.

As used in the present invention, "axis of the assembly" means an axis of symmetry of the presentation portion (A), in particular the axis (C) as shown in FIGS. 2A, 2 B and 2C.

In particular, the assembly comprises at least one position wherein one or the plane defined by the susceptor (13) has an angle less than 10° in relation to the horizontal, or even is horizontal, when the assembly does not rest on the lower face thereof.

The storage portion (B) may be covered at least partially by a susceptor and/or comprise a susceptor. More particularly, the susceptor present in the assembly (1) is only present on said portion (B).

In particular, the assembly comprises a susceptor which is located closer to the upper portion (11) than to the lower portion (12), and notably a portion of the susceptor is in contact with the upper portion (11).

More particularly, the susceptor is present at least partially, or even only, on the storage chamber (4).

As used in the present invention, a "susceptor" means an element, notably metallised, absorbing an electromagnetic radiation and converting same into heat.

The susceptor, in particular within the framework of a microwave application, may consist of at least 2 polymer, in particular PET, layers, wherebetween a very thin metallic, notably aluminum-based, layer has been deposited. The deposit of the metallised layer is generally carried out in a vacuum, which causes the metal to vaporise and enables extremely thin susceptors to be created. The PETs used may in general withstand a sharp increase in temperature, and maintenance thereof. The susceptor may notably have the role of absorbing the microwave radiation and of converting same into heat. The susceptor may increase very rapidly in temperature and diffuse thermal energy to some or all of the elements which are located in the immediate vicinity thereof.

The assembly (1) may comprise a portion (9) designed to form an opening (7) enabling the puffed composition to be sampled. Said portion (9) may notably be called removable portion.

According to one specific embodiment, the assembly according to the invention comprises a movable or removable portion, designed to be separated from the presentation chamber portion (5), such as to open the assembly (1), notably to enable access to the puffed composition by the consumer.

Said removable portion may notably comprise the lid of the assembly (1).

More particularly, said removable portion is connected to the storage chamber (4). Notably, this enables during the opening of the assembly (1) the storage chamber (4) soiled for example by the fat to be removed. Thus, the device (1) enables the presentation chamber (5) not to be soiled by all of the fats of the composition, and therefore to be clean or relatively clean, notably in terms of fats.

Said removable portion may also comprise at least one susceptor. In particular, the susceptor(s) present in the assembly (1) is(are) present only on said removable portion.

The assembly (1) according to the invention may comprise an upper face (11) and a lower face (12). Same may be rectangular or circular in shape. In particular, the upper face (11) has a surface equal to or larger than the lower face (12).

The lower face (12) may be defined as the face whereon the presentation chamber (5) rests when same is separated from the storage chamber (4). In general, the upper face (11) is the closest to the opening (7), in particular comprises the opening, or even merges with same. In particular, the upper face forms part of the removable portion.

In other words, the upper face may be the face whereon the opening designed to enable the puffed composition to be accessed is located.

The assembly (1) may comprise separation means (6) designed for separating the presentation chamber (5) from a portion (9) designed to form an opening (7). Said portion (9) may, for example, be a lid, in this case, the separation means may notably be a clipping of the lid on the wall (3).

The separation means (6) may, for example, be a pre-cutting of the wall (3), a materialisation of the portion to be cut on the external portion of the wall (3) or means for attaching a lid to the wall (3).

The wall (2) may be connected via attachment means (8) to the portion (9), notably such that when the presentation chamber and the portion (9) are separated, the storage chamber (4) may be removed at the same time.

Among the attachment means (8) glue may be cited.

The assembly (1) may comprise opening means (9). Said opening means (9) may consist of flaps attached to one another or a lid.

When the assembly (1) is open, at least one portion of the wall (2) may be located above the puffed composition (10), notably such that it is easy to remove the storage chamber (4).

The wall (2) may notably be produced with materials that are impermeable to light, air, humidity and/or fats. The latter may notably enable better conservation of the food composition.

The wall (3) may notably be rigid, and in particular it may be produced in plastic or from cardboard material, notably in virgin wood fibre cardboard in order to respect the food contact.

More particularly, the wall (2) enables liquid oil(s) to be used that have good nutritional and health qualities, in particular in terms of low content in partially hydrogenated fats and/or saturated fatty acids.

The wall (3) may comprise slots or openings enabling notably an evacuation of the water vapour and heat.

The dimensions of the storage chamber (4) are adjusted such as to enable the composition to be correctly puffed. As used in the present invention, "correctly puffed" means that at least 70%, notably at least 80%, in particular at least 90%, more particularly at least 95%, and even more particularly 99% of the grains constituting the food composition have been puffed.

In particular, the thickness of the storage chamber (4) may be less than or equal to 4 cm, notably less than or equal to 3 cm, in particular less than or equal to 2.5 cm, for example less than or equal to 2 cm, more particularly less than or equal to 1.5 cm.

In general, the storage chamber (4) comprises 5 to 300 g, notably 10 to 250 g, in particular 20 to 200 g of composition designed to be puffed.

The storage chamber (4) may open when exposed to the expansion of the puffed composition. In this case, the opening may most particularly be performed towards the lower face (12).

The storage chamber (4) may be produced, entirely or partially, in polyethylene, polypropylene, polyethylene terephtalate (PET), cellophane, Mylar, silicium or aluminum oxide-based laminated films, nylon, metal sheets, metallised polymer film, treated paper, laminated products, or a mixture thereof.

The storage chamber may more particularly be produced in PET, and notably comprises only 2 layers of PET at most, and notably, the seals may bring into play two layers of PET at most. This may notably enable the storage chamber to be opened without using excessive heating. Indeed, when 4 layers of PET are sealed, the heating required to open the storage chamber may be excessive and/or cause degradations.

In particular, the storage chamber may be produced on a vertical bagging machine.

More particularly, the storage chamber may be metallised or partially demetallised to define a susceptor.

The storage chamber (4) may have, after puffing, an intact portion on the upper face side (11). In particular, the storage chamber (4) opens on the side opposite the upper face.

The storage chamber (4) may comprise a plurality of compartments, each one comprising various portions or ingredients of the composition to be puffed. In particular, it comprises three compartments. One compartment may comprise grains to be burst, another at least one fat, and yet another at least one colouring agent and/or one flavouring.

The compartments may be separated in respect to one another, notably by a thin seal. In particular, sealing may be carried out via ultrasound or be a heat sealing.

During heating, the grains to be burst release vapour and result in the gradual release of ingredients on the grains. This may then enable, after opening of the various thin seals defining the compartments, the storage chamber (4) to be opened, notably in the direction opposite to the susceptor and/or to the opening of the device.

The compartments may open according to a specific time scheme. Notably according to the force required to open the various seals and according to the quantity of vapour released in the compartments, it is possible to arrange the compartments to open according to a fairly accurate time scheme. For example, the seal between the first compartment and the second may open after 1 minute of microwave heating at a certain power, then the seal between the second compartment and the third may open after 2 minutes of heating, etc. This may notably enable the heating of certain ingredients to be controlled and/or limited, at least partially, and thus, for example, limit the degradation of certain ingredients that may be sensitive to heat or control the degree of caramelization of the puffed composition, etc.

The presentation chamber (5) has in general a volume ranging from 150 to 9,000 cm$^3$, notably 300 to 7,500 cm$^3$, and in particular 600 to 6,000 cm$^3$.

Figure 1B:
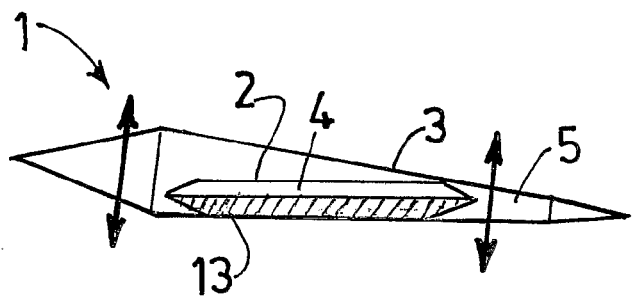

Thus as shown in FIGS. 1A and 1B, the assembly (1) may be presented in folded form, which may notably enable the space required for the storage thereof to be reduced.

The assembly (1) may be placed in a packaging, notably impermeable to light, air and/or water. Said packaging may enable a better conservation of the food composition.

In general, it is necessary to remove said packaging before heating.

The assembly according to the invention is specifically designed to be used in a microwave oven. In this case, the materials used are, of course, compatible with said conditions.

The assembly according to the invention may comprise materials designed to improve the microwave heating.

The assembly according to the invention comprises an edible composition designed to be puffed.

Said composition may notably comprise corn grains to be burst.

Said composition may also comprise at least one fat, notably a fat or an oil, notably palm oil, safflower oil, rapeseed oil, cotton seed oil, corn oil, linseed oil, peanut oil, sunflower oil and/or soya bean oil.

The composition may also comprise salt, pepper and/or paprika.

The composition may also comprise a sweetening agent, for example chosen in the list including sucralose, Isomalt, sugar, notably icing sugar or coarse sugar.

The composition may also comprise at least one texturizing agent and/or at least one tasting agent, for example chosen in the list including butter flavouring, caramel flavouring, cheddar flavouring, TexMex flavouring and pepper flavouring.

The composition may also comprise at least one flavouring, notably chosen in the list including sweet, sour, sugary, savoury, bitter, spicy and fruity, butter, cheese, cream, chive, dill, fines herbes, onion, garlic, bacon, pizza, tomato, vinegar, barbecue, cinnamon, nutmeg, smoked or a mixture thereof.

The composition may comprise at least one flavour enhancer.

The composition may further comprise at least one food colouring, notably chosen in the list including the natural orange colouring E160b.

According to another aspect, the aim of the invention is a method for preparing and presenting popcorn comprising at least the following steps consisting of:
- placing an assembly (1) according to invention, i.e. an assembly for preparing and presenting an edible composition designed to be puffed comprising:
- a portion (A) defining a chamber for enabling the puffed composition to be presented,
- a portion (B) defining a storage chamber designed to include at least one non-puffed composition, said portion (B) being arranged in the portion (A),
- in a heating apparatus, notably an oven, and in particular a microwave oven, the lower face (1) of the assembly not being in contact with the plane supporting the assembly according to the invention, for example the grill of the oven or the plate of the microwave oven,
- heating the assembly (1), in particular until the composition is puffed,
- opening the assembly, and
- removing the storage portion (4) from the composition designed to be puffed.

More particularly in the case where the assembly (1) comprises a removable portion comprising the storage portion (4) connected to a lid, the last two steps may be concomitant.

In particular, the method comprises an additional step consisting of placing the lower face (12) of the assembly (1) at an angle less than or equal to 30°, notably less than or equal to 20°, and in particular less than or equal to 10° in relation to the horizontal, or even horizontal, before the opening step.

According to yet another aspect, the aim of the invention is a method comprising at least one step consisting of inserting at least one non-puffed composition into an assembly according to the invention.

The invention claimed is:

1. An assembly for preparing an edible puffed composition from a non-puffed composition and for presenting the edible puffed composition, comprising:
   at least one non-puffed composition,
   a portion A defining a presentation chamber for presenting the edible puffed composition, the presentation chamber having a lower face and an upper face having an opening, and a portion B defining a storage chamber for at least said non-puffed composition, said storage chamber being arranged in the presentation chamber, wherein the storage chamber is arranged to open into the presentation chamber in a direction opposite to the opening of the presentation chamber when exposed to expansion of the composition during puffing, wherein the storage chamber has a cross-section decreasing at an end disposed towards the upper face of the presentation chamber, and wherein the storage chamber is removable through the opening.

2. An assembly according to claim 1, wherein the portion A comprises a lid closing the opening.

3. An assembly according to claim 1, wherein the storage chamber comprises a plurality of compartments.

4. An assembly according to claim 1, wherein the storage chamber is metalized or partially demetalized to define a susceptor.

5. An assembly according to claim 1, wherein the composition comprises corn to be burst.

6. An assembly according to claim 1, wherein the composition designed to be puffed comprises at least one fat.

7. An assembly according to claim 2, wherein a wall of the storage chamber is connected via attachment means to the lid.

8. An assembly according to claim 1, wherein the storage chamber is at least partially made of at least one of polyethylene, polypropylene, polyethylene terephthalate (PET), cellophane, Mylar, silicon or aluminum oxide-based laminated films, nylon, metal sheets, metalized polymer film, treated paper, and laminated products.

9. An assembly according to claim 5, wherein the composition designed to be puffed comprises at least one liquid oil.

10. An assembly according to claim 1, wherein:
the upper face of the presentation chamber includes a removable lid closing the opening; and
the storage chamber is attached to the lid so that the storage chamber is entirely removable through the opening of the presentation chamber with the lid when the lid is taken off.

11. An assembly according to claim 10, wherein the presentation chamber comprises the non-puffed composition.

12. An assembly according to claim 10, wherein the lid comprises a susceptor.

13. An assembly according to claim 10, wherein the storage chamber is arranged to open toward the lower face of the presentation chamber when exposed to the expansion of the composition during the puffing.

14. An assembly according to claim 1, further comprising a susceptor able to absorb an electromagnetic radiation and convert the electromagnetic radiation into heat, and for heating the non-puffed composition to a temperature enabling puffing of the non-puffed composition when the assembly is subjected to microwave heating, wherein the storage chamber comprises the susceptor, and wherein the storage chamber with the susceptor is removable through the opening.

* * * * *